United States Patent
Bonang et al.

(10) Patent No.: US 9,560,012 B1
(45) Date of Patent: Jan. 31, 2017

(54) CROSS DOMAIN GATEWAY HAVING TEMPORAL SEPARATION

(71) Applicant: The Boeing Company, Chicago, IL (US)

(72) Inventors: James Joseph Bonang, Garden Grove, CA (US); Marco Anthony Corrado, Westminster, CA (US); Michael Cohen Hogan, Huntington Beach, CA (US); Kevin Dale Singer, Fountain Valley, CA (US)

(73) Assignee: The Boeing Company, Chicago, IL (US)

( * ) Notice: Subject to any disclaimer, the term of this patent is extended or adjusted under 35 U.S.C. 154(b) by 853 days.

(21) Appl. No.: 13/929,403

(22) Filed: Jun. 27, 2013

(51) Int. Cl.
| | |
|---|---|
| *H04L 29/06* | (2006.01) |
| *H04L 12/66* | (2006.01) |
| *G06F 9/00* | (2006.01) |
| *G06F 15/16* | (2006.01) |
| *G06F 7/04* | (2006.01) |

(52) U.S. Cl.
CPC .......... *H04L 63/0209* (2013.01); *H04L 12/66* (2013.01)

(58) Field of Classification Search
None
See application file for complete search history.

(56) References Cited

U.S. PATENT DOCUMENTS

| | | | | |
|---|---|---|---|---|
| 5,969,632 | A * | 10/1999 | Diamant | G06F 21/55 340/5.3 |
| 8,391,543 | B1 * | 3/2013 | Verma | G06F 21/556 283/113 |
| 8,745,742 | B1 * | 6/2014 | Satish | G06F 7/00 380/202 |
| 9,021,547 | B1 * | 4/2015 | Lin | H04L 63/20 713/151 |
| 2003/0026226 | A1 * | 2/2003 | Miura | H04W 72/10 370/335 |
| 2003/0028799 | A1 * | 2/2003 | Cordella, Jr. | G06F 21/57 726/17 |
| 2003/0140251 | A1 * | 7/2003 | Marin | G06F 21/50 726/3 |
| 2006/0095548 | A1 * | 5/2006 | Rabot | H04L 12/5692 709/220 |

(Continued)

*Primary Examiner* — Shin-Hon Chen
(74) *Attorney, Agent, or Firm* — Kunzler Law Group, PC

(57) ABSTRACT

A computer network is disclosed that includes a first domain and a second domain. The second domain has a higher security classification than the first domain. The computer network also comprises a Temporal Separation Cross Domain Gateway (TSEP-CDG) having a temporal separation hardware interlock. The interlock is configured to physically prevent communication between the first and second domains. It connects with the first domain in a first state to allow the TSEP-CDG to receive data from the first domain. The TSEP-CDG executes an information-invariant data transformation (IIDT) on the received data before it is available to the second domain. The IIDT alters the representation of the data while conveying the same information, disrupting anti-malware present in the received data. The temporal separation hardware interlock is configured for connection with the second domain in a second state to allow the TSEP-CDG to transmit the transformed data to the second domain.

20 Claims, 6 Drawing Sheets

(56) References Cited

U.S. PATENT DOCUMENTS

| | | | | |
|---|---|---|---|---|
| 2007/0094463 | A1* | 4/2007 | Brown | G06F 21/6209 |
| | | | | 711/159 |
| 2010/0299724 | A1* | 11/2010 | Masiyowski | H04L 63/105 |
| | | | | 726/4 |
| 2012/0278529 | A1* | 11/2012 | Hars | G06F 12/0246 |
| | | | | 711/103 |
| 2013/0279499 | A1* | 10/2013 | Beacham | H04Q 3/00 |
| | | | | 370/352 |
| 2014/0059692 | A1* | 2/2014 | Dapp | G06F 21/606 |
| | | | | 726/26 |
| 2014/0108803 | A1* | 4/2014 | Probert | G06F 21/125 |
| | | | | 713/170 |
| 2014/0170601 | A1* | 6/2014 | Wokurka | G09B 9/302 |
| | | | | 434/35 |
| 2015/0023437 | A1* | 1/2015 | Nguyen | H04B 3/54 |
| | | | | 375/257 |

* cited by examiner

CROSS DOMAIN GATEWAY HAVING TEMPORAL SEPARATION

BACKGROUND

Portable, hand-held devices such as digital cameras and smart phones improve battlefield situational awareness and intelligence collection capabilities for dismounted personnel. Information collected using these devices, particularly images, may be transferred to systems such as the Force XXI Battle Command Brigade and Below (FBCB2), Joint Battle Command Platform (JBC-P) and the Tactical Ground Reporting System (TIGR).

Commercial Off-the-Shelf (COTS) portable devices are inexpensive and provide great utility. However, they often lack security features essential to military operations and their use must be limited to unclassified information. Such devices are also a threat vector, providing a conduit for malware to be introduced into critical Command, Control, Communication, Computers, Intelligence, Surveillance, and Reconnaissance (C4ISR) systems. Moreover, battlefield C4ISR systems generally operate at the Secret security classification level or higher.

A Cross Domain Solution (CDS) allows the secure transfer of information between two or more differing security domains. For example, a CDS may serve as the conduit for moving a data file from a computer system connected to the Non-secure Internet Protocol Router Network (NIPRNet), an Unclassified-level security domain, to the Secure Internet Protocol Router Network (SIPRNet), which is a Secret-level security domain A CDS may include a Cross Domain Gateway (CDG) to automate transferring information between security domains (a.k.a., enclaves). The Cross Domain Gateway (CDG) acts as a network gateway device, physically interfacing the computer networks constituting the security domains.

Conventional CDGs are continuously connected to both networks. The CDG may be connected simultaneously via Ethernet to both the lower security classification and higher security classification computer networks. Since the connection is continuous, such CDGs must filter transferred data based on user-programmable rule sets. Data may be sent through the CDG unaltered, redacted during transfer, or blocked entirely. This places a substantial burden on CDG hardware design and software, particularly in view of the need to update the user-programmable rule sets to counter the most recent computer security threats.

SUMMARY

A computer network is disclosed that includes a first domain and a second domain, where the second domain has a higher level of security classification than the first domain. The computer network also comprises a Temporal Separation Cross Domain Gateway (TSEP-CDG) having a temporal separation hardware interlock. The temporal separation hardware interlock is configured to physically prevent communication between the first and second domains. To this end, the temporal separation hardware interlock is configured for connection with the first domain in a first state in which the TSEP-CDG receives data from the first domain. The TSEP-CDG executes an information-invariant data transformation (IIDT) on the received data to alter the representation of the data while conveying the same information, thereby disrupting any malware present in the received data. The IIDT may be executed: 1) immediately as the data is received from the first domain, 2) on sections of the received data that have been temporarily stored in local volatile memory, or 3) on entire files received and stored in the local volatile memory. The transformed data is stored in another local memory that is segregated from any volatile memory that may have been used temporarily store the data received from the first domain. The further local memory may be implemented as non-volatile memory and/or a RAMdisk. The original data received from the first domain is deleted after the transformation is complete. As such, the original data is never sent to or exposed to the second domain. The temporal separation hardware interlock is configured for connection with the second domain in a second state in which the TSEP-CDG transmits the transformed data to the second domain.

The features, functions, and advantages that have been discussed can be achieved independently in various embodiments or may be combined in yet other embodiments further details of which can be seen with reference to the following description and drawings.

DETAILED DESCRIPTION

Figure 1:
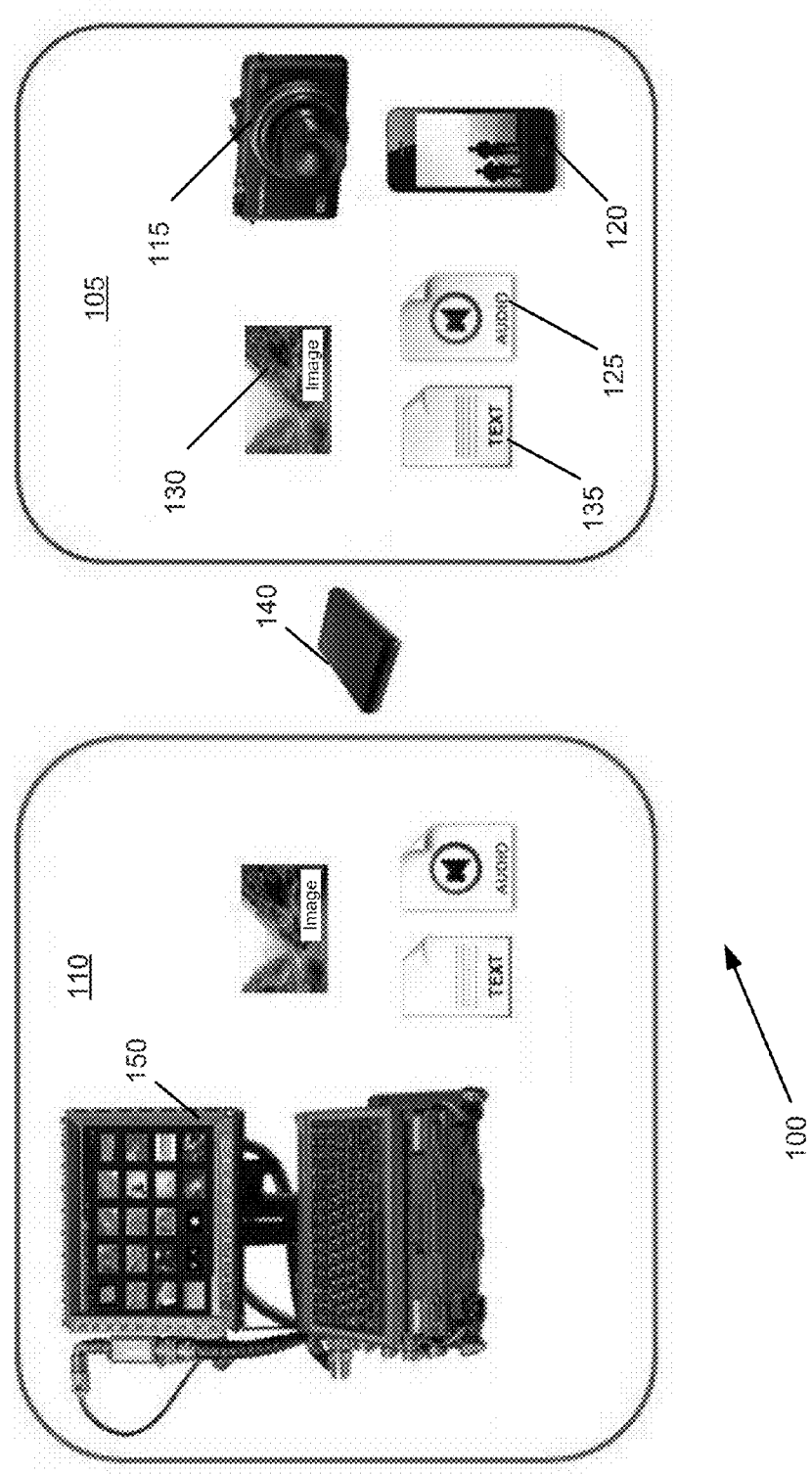
FIG. 1 shows a computer network having a first domain and a second domain, where the second domain has a higher classification level than the first domain.

FIG. 1 shows a computer network 100 having a first domain 105 and a second domain 110. The second domain 110 has a higher level of security classification than the first domain 105. The second domain 110 may include systems such as the Force XXI Battle Command Brigade and Below (FBCB2), Joint Battle Command Platform (JBC-P), and/or Tactical Ground Reporting System (TIGR). Other security system domains are likely contemplated for use in the computer network 100.

Portable devices, such as digital cameras 115 and/or smart phones 120 may acquire data, such as data that may be used by a system of the second domain 110. Such devices may be used, for example, to collect information used to improve situational awareness and intelligence capabilities for dismounted personnel. Audio files 125, image files 130, and text files 135 may be acquired and stored in the first domain 105 for this purpose.

Most portable devices lack the security features needed to transfer the stored files to the higher, classified, second domain 110. Therefore, a cross domain solution is needed to securely transfer data from the first domain 105 to the second domain 110. To this end, a Temporal Separation Cross Domain Gateway (TSEP-CDG) 140 is provided to facilitate secure transfer of the data.

The TSEP-CDG 140 differs in several ways from a conventional CDG. The TSEP-CDG 140 uses temporal separation of security enclaves, depicted here as the first domain 105 and second domain 110, rather than providing a continuous connection between both. Further, the TSEP- CDG 140 need not employ rule-based filtering. Rather, IIDTs on data received from the first domain 105 may provide data security. These two approaches, temporal separation and IIDTs simplify the TSEP-CDG 140 architecture and operation, reducing the need for maintenance, such as updates to filter rules, and easing deployment in the tactical environment by reducing and/or eliminating the need to administrate the device except in unusual circumstances.

Figure 2:
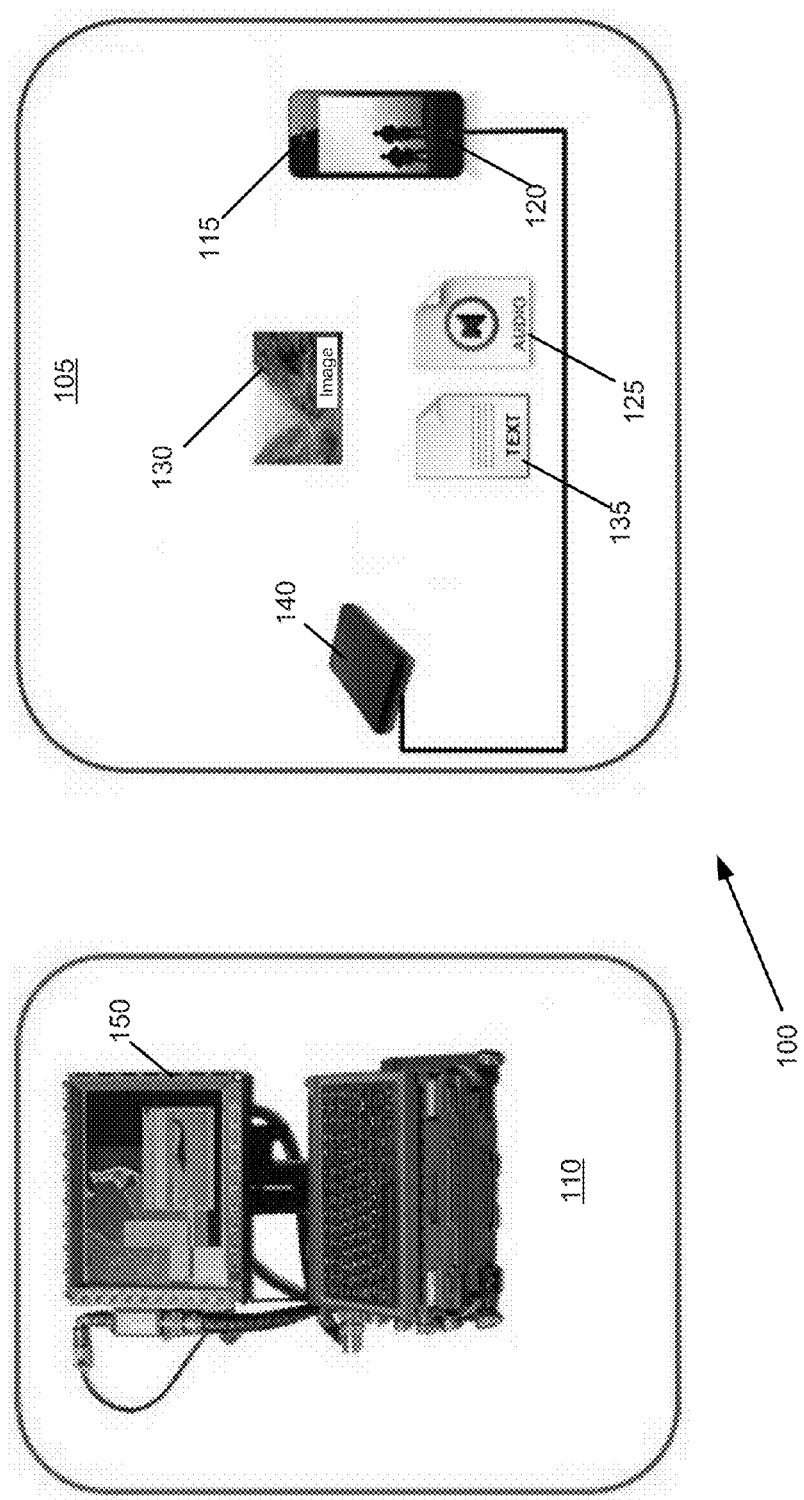
FIGS. 2 and 3 illustrate how a temporal separation cross domain gateway (TSEP-CDG) may transfer data from the first domain to the second domain shown in FIG. 1.
Figure 3:
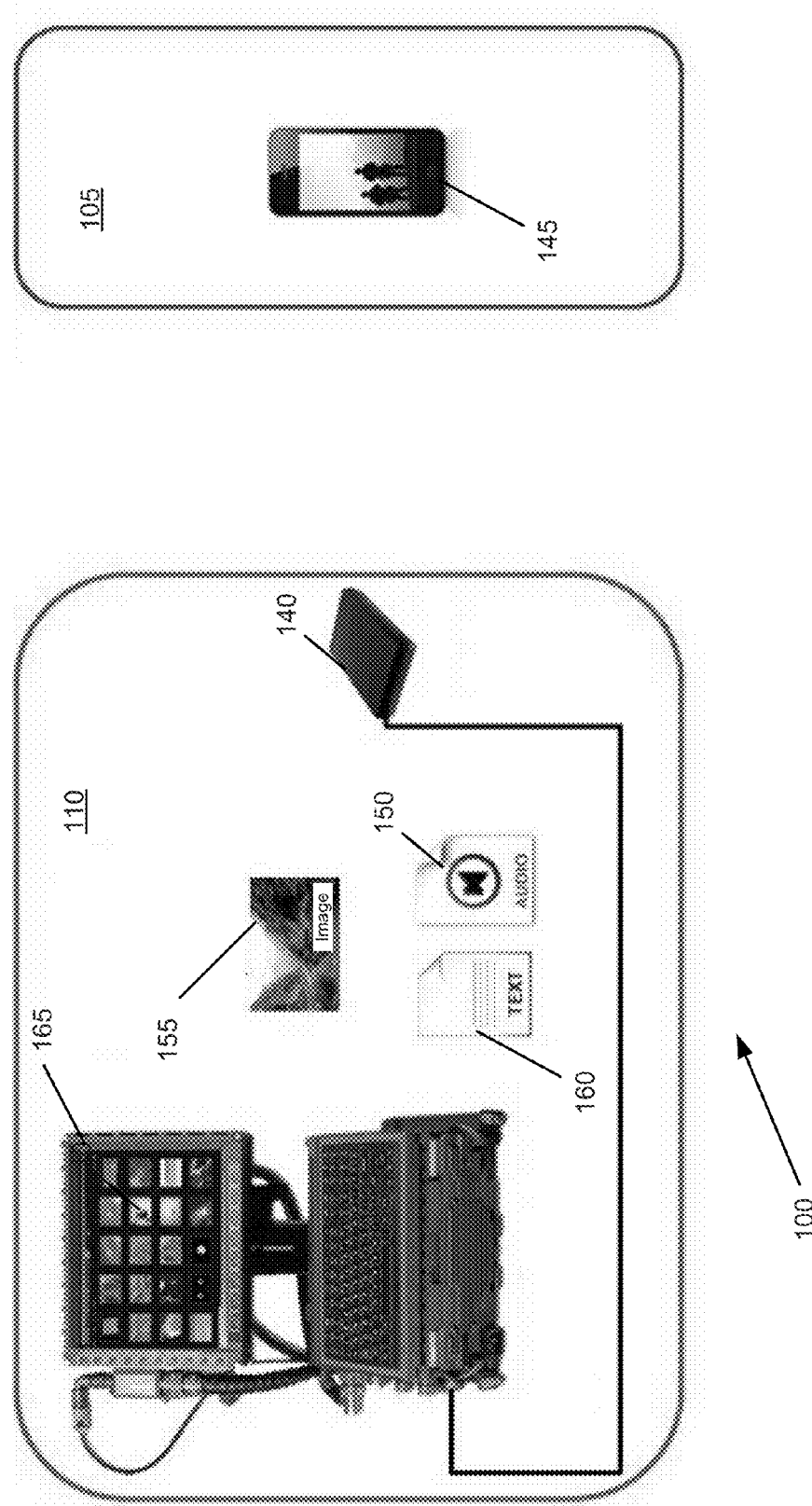

FIGS. 2 and 3 illustrate how the TSEP-CDG 140 may transfer data from the first domain 105 to the second domain 110. In FIG. 2, the TSEP-CDG 140 is operating in a first mode in which it receives audio files 125, image files 130, and/or text files 135 from a portable smart phone 145 in the first domain 105. In this first mode, the TSEP-CDG 140 is in physical communication with the smart phone 145 and concurrently disconnected from communication with the second domain 110. The files detected on the device in the first domain 105 are uploaded to the TSEP-CDG 140, where they undergo an IIDT operation for subsequent transfer to the second domain 110. Power for the TSEP-CDG 140 while operating in the first mode may be provided by an internal battery to prevent power drain from the smart phone 120.

In FIG. 3, the TSEP-CDG 140 is operating in a second mode in which it is in communication with the second domain 110 to transfer the transformed audio files 150, transformed picture files 155, and/or transformed text files 160 to, for example, a host system 165 running host system software in the second domain 110. In this second mode, the TSEP-CDG 140 is in physical communication with the second domain 110 and concurrently disconnected from communication with the first domain 105. With the temporal separation properties of the TSEP-CDG 140, only one domain (e.g., computer system) at one security classification level can be connected to the TSEP-CDG 140 at one time. Power for the TSEP-CDG 140 while operating in the second mode may be provided by host system 165. The received power may also charge the internal battery.

As noted, the TSEP-CDG 140 may be configured to process data received from the first domain 105 by executing an IIDT on the received data. The transformation is executed on all of the received data before the transformed data is transferred to the second domain 110. IIDT represents an alternative approach that can prevent zero-day attacks and reduce the necessity for continual updates to antivirus software malware definitions. IIDTs preserve the information in uploaded files while altering their data representation sufficiently to destroy embedded malware. IIDTs often rely on two principal techniques: Random Lossy Transformations and Random Steganography. Random Lossy Transformations select the properties of lossy transformations, such as JPEG image file compression, at random. Random Steganography inserts noise, or random changes to the data representation of a file in such a way that the change is imperceptible. These techniques disrupt malware, and also address the threat posed by robust malware (i.e., malware able to survive transformation, perhaps in a degraded form), and reconstituting malware (i.e., malware able to reconstitute itself under a known transformation).

Figure 4:
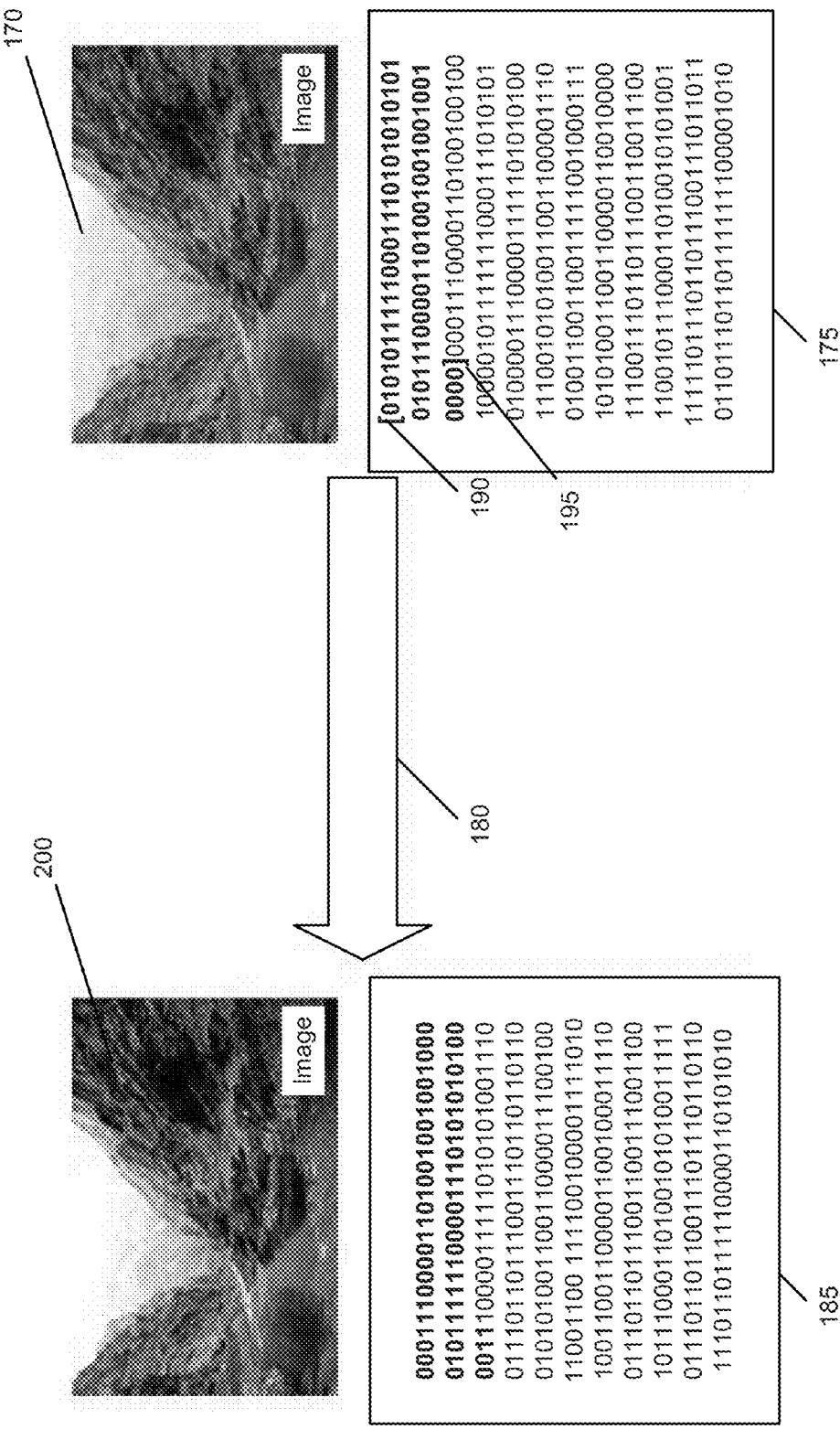
FIG. 4 illustrates how an information invariant data transform may be accomplished with respect to transferring an image, such as a JPEG image, from the first domain to the second domain.

FIG. 4 illustrates how an IIDT may be accomplished for transferring an image, such as a JPEG image, from the first domain 105 to the second domain 110. In FIG. 4, a JPEG image 170 from the first domain 105 is represented as binary data 175. The TSEP-CDG 140 executes an IIDT as shown by arrow 180 before transferring the transformed binary data 185 to the second domain 110. In this example, binary data between 190 and 195 represents malware. As a result of the IIDT, the binary data of the malware has been altered by the TSEP-CDG 140, thus destroying the malware, while the appearance of the image remains unchanged insofar as a human observer can perceive. This transformed binary data 185 may be used by the host system 165 to reproduce the image 200, which substantially corresponds to JPEG image 170. Similar transformations may be executed on other file types, such as audio files, video files, text files, etc. 185

Figure 5:
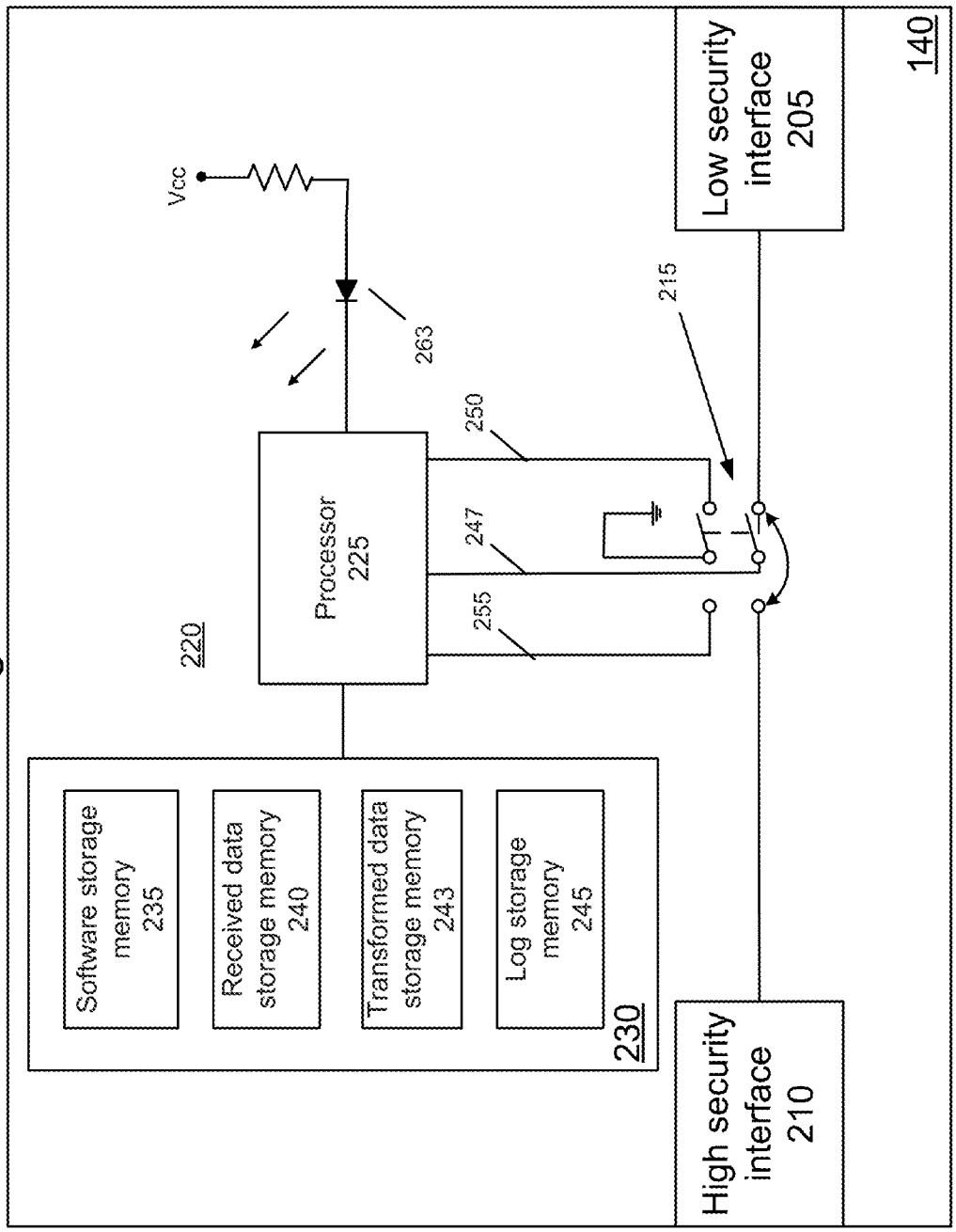
FIG. 5 illustrates one embodiment of a TSEP-CDG.

FIG. 5 illustrates one embodiment of the TSEP-CDG 140. In this example, the TSEP-CDG 140 includes a low security interface 205 (low security interface) configured for connection with the first domain 105, and a high security interface 210 configured for connection with the second domain 110. A temporal separation hardware interlock 215 is disposed between the low security interface 205 and high security interface 210, and is manually operable between a first mode and a second mode. The temporal separation hardware interlock 215 in the illustrated embodiment is a Double Pole Double Throw (DPDT) switch.

The TSEP-CDG 140 also includes a processing system, shown at 220. The processing system includes a processor 225 configured to access memory storage 230. Memory storage 230 includes software storage memory 235, which contains software executable by the processor 225. The software storage memory 235 may be non-volatile memory. Memory storage 230 also includes received data storage memory 240, which may be used for temporary storage of the data received from the first domain during the IIDT. Transformed data storage memory 243 is used to store the data that has already been subject to the IIDT, and may be implemented using non-volatile memory and/or a RAMdisk. Memory 230 also includes log storage memory 245, which likewise may be implemented using non-volatile memory and/or a RAMdisk.

The processing system 220 is configured to receive data provided at the low security interface 205 through the temporal separation hardware interlock 215 when the temporal separation hardware interlock 215 is in a first state (i.e., the interlock is manually switched to a first position). Here, data received at the low security interface 205 is provided to the processor 225 on data bus 247 through an electrical path provided between the low security interface 205 and the processor 225 by the temporal separation hardware interlock 215. In the first state, the temporal separation hardware interlock 215 is physically connected to the low security interface 205 and physically disconnected from the high security interface 210. A path for data communication between the low security interface 205 and high security interface 210 in the first state is not present. The processor 225 may receive an indication that the temporal separation hardware interlock 215 is in the first state at line 250, which is at electrical ground when the temporal separation hardware interlock 215 is in the first state. Once all of the uploaded data that is to be received by the TSEP-CDG has been transformed, the processor 225 activates a visual indicia 263, such as an LED, which can be used as a prompt to disconnect the TSEP-CDG 140 from the first domain 105.

The received data may be processed with the IIDT immediately as each portion is received by the TSEP-CDG 140 from the first domain. Additionally, or alternatively, the received data may be temporarily stored as individual portions or complete files in the received data storage memory 240, in which case at least portions of the received data are stored locally before being subject to the IIDT. The transformed data is stored in the transformed data storage memory 243 prior to placing the temporal separation hardware interlock 215 in the second state. The IIDT alters the representation of the data while conveying the same information, thereby disrupting any malware present in the received data.

When the temporal separation hardware interlock 215 is placed in the second state, it is physically connected to the high security interface 210 and physically disconnected from the low security interface 205. In this second state, the processor 225 is in electrical communication with the high security interface 210 at bus 255 through the temporal separation hardware interlock 215. The processor 225 may receive an indication that the temporal separation hardware interlock 215 is in the second state at line 260, which is at electrical ground when the temporal separation hardware interlock 215 is in the first state.

Prior to exposing the second domain to data in the TSEP-CDG 140, the data received from the first domain is deleted. As such, only the transformed data is present on the TSEP-CDG 140 in the second state. The data received from the first domain is never exposed transferred to the second domain. The temporal separation hardware interlock 215 ensures that the two domains remain separated until all the data received from the first domain has been subject to the IIDT.

When the host system 165 is connected to the high security interface 210 while the temporal separation hardware interlock 215 is in the second state, the IIDT data stored in the transformed data storage memory 243 is communicated to the host system 165 for display, processing, or the like. In one embodiment, the host system 165 may include a web browser interface to view or otherwise manipulate the data received from the TSEP-CDG 140.

Figure 6:
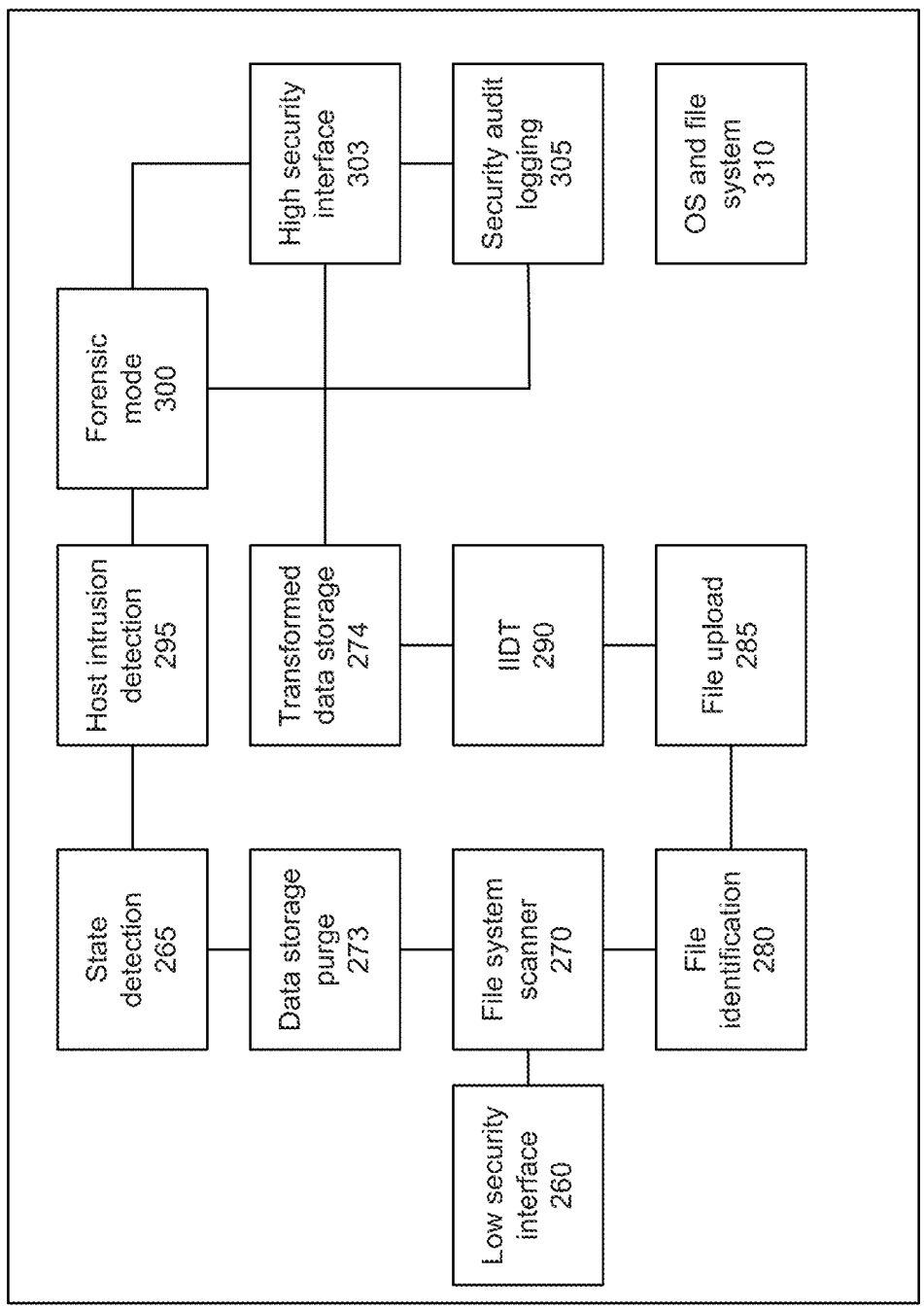
FIG. 6 illustrates various software modules that may be used in the TSEP-CDG.

FIG. 6 illustrates various software modules that may be used in the TSEP-CDG 140. In this example, a state detection module 265 is used to determine the state of the temporal separation hardware interlock 215. Before the temporal separation hardware interlock 215 is switched from the first state to the second state, the processing system 220 executes a data storage purge module 273, which purges the received data storage memory 240 to prevent unauthorized access of prior accumulated data through the low security interface 205 as well as to remove any malware stored in the received data storage memory 240. Further, if images from a second portable device in the first domain 105 are to be uploaded, only images from that device will be visible for upload. No data previously uploaded from a different portable device will be present on the TSEP-CDG 140.

In the first state, a low security interface module 275 controls communication of data from the low security interface 205 to a file system scanner module 270. The file system scanner module 270 scans the files of a device in the first domain 105 (e.g., portable device). The file system of the portable device to be examined is scanned without mounting the device's file system. This may be accomplished using software, such as Mtools®, that allows the File Allocation Table (FAT) 32 file system of the portable device to be examined without mounting the device's file system. Further, the file system scanner module 270 may also be configured to prevent auto-run communication capabilities, such as those associated with a USB interface. This also prevents the portable device from unauthorized access.

As the file system scanner module 270 scans the file system of the portable device, a file identification module 280 identifies recent image, text, video, and audio files that may be uploaded. The portable device's file system, such as the FAT 32 file system, may record the time when a file was last modified, so the TSEP-CDG 140 may present the list of uploadable files to a user in reverse chronological order.

Files are identified and uploaded by file identification module 280 and file upload module 285 until all files, or a subset of files, have been uploaded into received data storage memory 240 on the TSEP-CDG 140. Alternatively, any upload to the received data storage memory 240 may be bypassed in favor of direct execution of the IIDT on the data as it is received.

IIDT module 290 executes the IIDT on each of the files uploaded from the portable device, and transformed data storage module 274 stores the transformed data in the transformed data storage memory 243. The files are given unique names to avoid filename collisions. Each name may include a globally unique identifier (GUID) character string within the basename of the filename. Otherwise, if files from multiple portable devices are uploaded in series before being imported to the host system 165, the filenames may collide. Access to the data in the transformed data storage memory 243 by the host system 165 is controlled by high security interface module 303.

Modules 295, 300, 305, and 310 may include various enhancements to the security of the TSEP-CDG 140. A host intrusion detection module 295 may examine the TSEP-CDG software during transition of the temporal separation hardware interlock 215 from the first state to the second state. The connection to the second domain 110 is not enabled if the host intrusion detection module 295 detects an anomaly. Additionally, the host intrusion detection module 295 may disable connection to the second domain 110 if any exfiltration attempt is detected when connected to the second domain 110. Other constraint checks may be imposed using the host intrusion detection module 295 as well.

If the host intrusion detection module 295 detects any of the foregoing unauthorized activities, the TSEP-CDG 140 executes a forensic mode module 300, and a warning light is displayed to indicate the device is to be brought in for forensic analysis. In forensic mode, the TSEP-CDG's uploads are disabled; however, file imports are enabled to allow examination of files stored in file system and/or operating system 310, audit logs generated by security audit logging module 305, or any other files associated with a security breach.

The security audit logging module 305 may use rotating security audit logs, which will be available for upload in forensic mode. The logs may be stored in the log storage memory on 245 of the TSEP CDG 140. Using rotating logs ensures the persistent storage of the TSEP-CDG 140 never overflows with audit data.

The operating system 310 of the TSEP-CDG 140 may be, for example, Security-enhanced (SE) Linux or SE Android. Security-enhanced Linux is a set of Linux Operating System (OS) Kernel patches, along with related utility programs, that incorporate a Mandatory Access Control (MAC) mechanism into the major subsystems of the kernel. SE Linux and SE Android enforce separation of information based on confidentiality and integrity requirements, which allows threats of tampering and bypassing of application security mechanisms to be addressed and enables the confinement of damage that can be caused by malicious or flawed applications.

The host system 165 includes TSEP-CDG host system support software that is deployed to facilitate connection with the TSEP-CDG 140 when it is in the second mode. The host system 165 may be a ruggedized laptop or a computer system mounted in a vehicle (such as an FBCB2 system) that provides a radio or network connection to a network operating at the higher security classification level, such as the U.S. Army's Tactical Internet or the SIPRNet. The TSEP- CDG host system support software includes File Import, which allows image, audio and text files to be imported from the TSEP-CDG 140 to the host system 165, and file transfer capabilities, which allow the imported files to be transferred to other classified systems. A file browser/organizer may be used to allow the user to browse thumbnails of uploaded files and to view and annotate full-scale images.

The invention claimed is:

1. A computer network comprising:
   a first domain, the first domain having a first security classification such that the first domain accepts data in response to the data complying with the first security classification;
   a second domain, the second domain having a second security classification such that the second domain accepts data in response to the data complying with the second security classification, wherein the security classification of the second domain has a higher level of security classification than the security classification of the first domain; and
   a Temporal Separation Cross Domain Gateway (TSEP-CDG) having a temporal separation hardware interlock configured to physically prevent communication between the first and the second domains, wherein the TSEP-CDG is configured to:
   connect, via the temporal separation hardware interlock, with the first domain;
   receive data from the first domain, the data complying with the first security classification of the first domain, but not the second security classification of the second domain;
   disconnect the temporal separation hardware interlock from the first domain;
   execute an information-invariant data transformation on the received data to transform the data to comply with the security classification of the second domain;
   connect, via the temporal separation hardware interlock, with the second domain;
   transmit the transformed data to the second domain, the transformed data complying with the security classification of the second domain; and
   disconnect the temporal separation hardware interlock from the second domain.

2. The computer network of claim 1, wherein the TSEP-CDG is configured to execute the information-invariant data transformation on the data from the first domain immediately as it is being received TSEP-CDG.

3. The computer network of claim 1, wherein the TSEP-CDG is configured to temporarily store received data in volatile memory before executing the information-invariant data transformation.

4. The computer network of claim 3, wherein the TSEP-CDG is configured to execute a data purge operation on the volatile memory prior to connecting with the second domain.

5. The computer network of claim 1, wherein the TSEP-CDG stores the transformed data locally on a RAMdisk or non-volatile memory and transfers the stored transformed data to the second domain when the temporal separation hardware interlock is connected to the second domain.

6. The computer network of claim 1, wherein the TSEP-CDG comprises a first communication interface for connection to the first domain, and a second communication interface for connection to the second domain, wherein the first communication interface and the second communication interface are physically isolated from one another by the temporal separation hardware interlock.

7. The computer network of claim 1, wherein the first domain comprises a portable electronic device.

8. The computer network of claim 7, wherein the first domain comprises a portable electronic device selected from the group consisting of a portable phone, a digital camera, and a memory card.

9. A Temporal Separation Cross Domain Gateway (TSEP-CDG) comprising:
   a first communication interface configured for connection with a first domain, the first domain having a first security classification such that the first domain accepts data in response to the data complying with the first security classification;
   a second communication interface configured for connection with a second domain, the second domain having a second security classification such that the second domain accepts data in response to the data complying with the second security classification, wherein the security classification of the second domain has a higher security level of classification than the security classification of the first domain;
   a temporal separation hardware interlock configured to physically prevent communication between the first and the second domains; and
   a processing system configured to
   connect, via the temporal separation hardware interlock, with the first domain;
   receive data provided at the first communication interface from the first domain, the data complying with the first security classification of the first domain, but not the second security classification of the second domain;
   disconnect the temporal separation hardware interlock from the first domain;
   execute an information-invariant data transform on the received data to transform the data to comply with the security classification of the second domain;
   connect, via the temporal separation hardware interlock, with the second domain;
   provide the information-invariant transformed data at the second communication interface to the first domain, the transformed data complying with the security classification of the second domain; and
   disconnect the temporal separation hardware interlock from the second domain.

10. The TSEP-CDG of claim 9, wherein the processing system is further configured to execute a data storage purge of the received data prior to provision of the information-invariant transform data at the second communication interface.

11. The TSEP-CDG of claim 9, wherein the processing system is further configured to upload files from a device connected to the first communication interface without mounting a filesystem of the device.

12. The TSEP-CDG of claim 11, wherein the device comprises a portable phone, portable computer, or portable camera.

13. The TSEP-CDG of claim 9, wherein the processing system is further configured to detect an attempted access of a host system through the second communication interface.

14. The TSEP-CDG of claim 13, wherein the processing system is further configured to enter a forensic mode wherein the attempted access of the host system is detected.

15. The TSEP-CDG of claim 9, wherein the processing system executes a custom file system.

16. The TSEP-CDG of claim 9, wherein at least one of the first and second communication interfaces comprise USB ports.

17. The TSEP-CDG of claim 16, wherein auto-run capability of the USB ports is disabled.

18. A method for transferring data from a first domain to a second domain through a Temporal Separation Cross Domain Gateway (TSEP-CDG) having a temporal separation hardware interlock, wherein the second domain has a higher level of security classification than the first domain, the method comprising:

connecting, via the temporal separation hardware interlock, with the first domain;

receiving data provided at the first communication interface from the first domain, the data complying with the first security classification of the first domain, but not the second security classification of the second domain;

disconnecting the temporal separation hardware interlock from the first domain;

executing an information-invariant transformation on the received data to transform the data to comply with the security classification of the second domain;

connect, via the temporal separation hardware interlock, with the second domain;

providing the information-invariant transformed data at the second communication interface to the first domain, the transformed data complying with the security classification of the second domain; and disconnecting the temporal separation hardware interlock from the second domain.

19. The method of claim 18, further comprising executing a data storage purge operation of the received data prior to providing the information-invariant transformed data to the second domain.

20. The method of claim 18, further comprising uploading files from a device of the first domain without mounting a file system of the device.

* * * * *